(No Model.) 2 Sheets—Sheet 1.

W. LAKE.
VENTILATED VAULT COVER.

No. 482,013. Patented Sept. 6, 1892.

Attest:
Geo. T. Smallwood,
G. Y. A____

Inventor
Wilmot Lake (No Model.) 2 Sheets—Sheet 2.

W. LAKE.
VENTILATED VAULT COVER.

No. 482,013. Patented Sept. 6, 1892.

Attest:
Geo. T. Smallwood.
G. J. ArLee

Inventor:
Wilmot Lake

UNITED STATES PATENT OFFICE.

WILMOT LAKE, OF CHARLTON HEIGHTS, MARYLAND.

VENTILATED VAULT-COVER.

SPECIFICATION forming part of Letters Patent No. 482,013, dated September 6, 1892.

Application filed November 6, 1891. Serial No. 411,074. (No model.)

*To all whom it may concern:*

Be it known that I, WILMOT LAKE, a citizen of the United States, residing at Charlton Heights, in the county of Prince George's and State of Maryland, have invented certain new and useful Improvements in Ventilated Vault-Covers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates generally to underground conduits, and more especially to covers for manholes therefor, and it has for its object, among other things, to provide for approved ventilation and drainage, whereby while thorough ventilation is secured, yet water is excluded from the conduit and drainage is effected at the surface, greatly simplifying the construction of the parts and dispensing with the use of a drain-pipe below the surface.

My invention therefore consists, primarily, of a ventilated covered basin or trap adapted to provide for drainage at the surface, and, further, in constructing the bottom of the trap-chamber somewhat after the fashion of a truncated cone, the top edge of the cone standing above the upper edge of the trap or basin.

It consists, also, of a rounded or crowning cover having, in addition to ventilating-openings arranged out of alignment with the manhole proper in the trap or basin, a series of preferably concave channels in its under side registering with a series of cavities in the upper edge of the lower side of the trap, thus providing overflow openings or outlets for drainage, all substantially as hereinafter more fully set forth, and pointed out in the claims.

Figure 1:
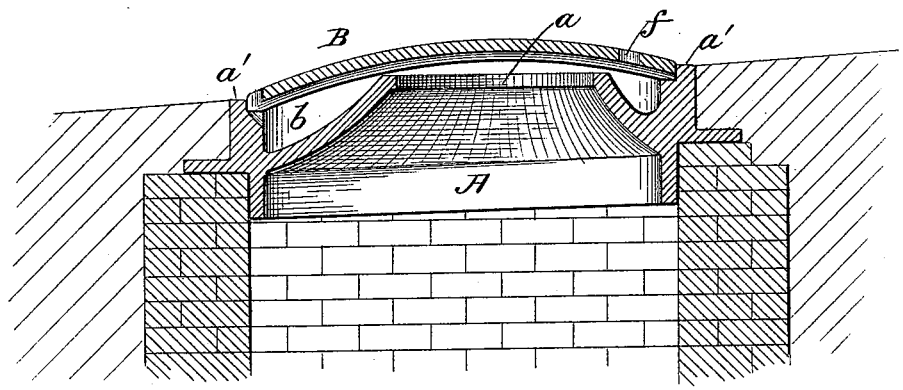
Figure 2:
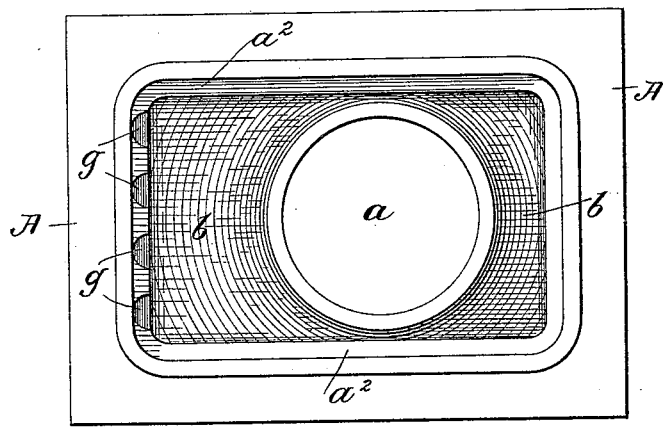
Figure 3:
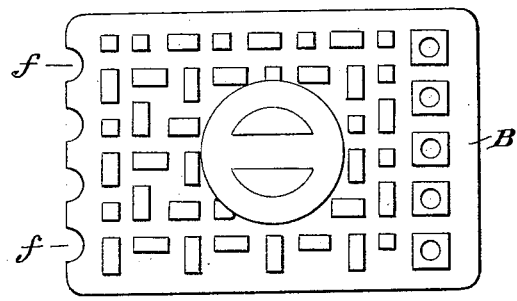
Figure 4:
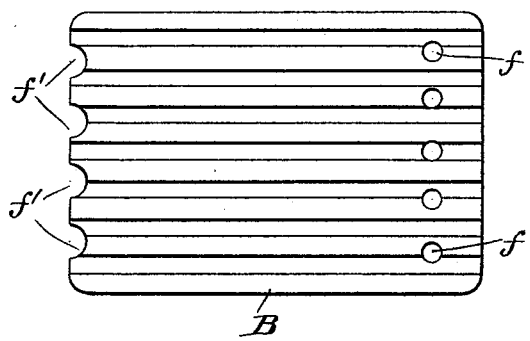
Figure 5:
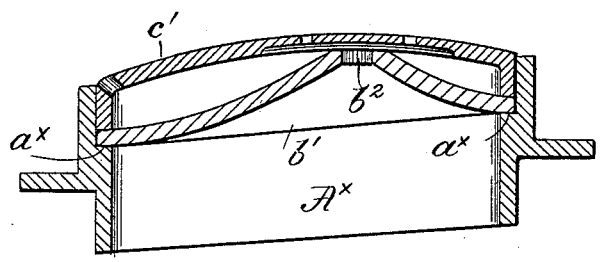
Figure 6:
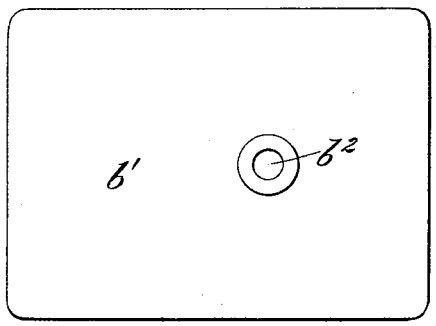

In the accompanying drawings, Figure 1 is a sectional view showing my invention in position for use. Fig. 2 is a plan view of the trap or basin with the cover removed. Fig. 3 is a plan view of the cover. Fig. 4 is an inverted view of the cover, and Figs. 5 and 6 are a sectional view of a modification of the invention, and a plan view of the removable bottom of the trap-chamber, respectively.

In the organization of my invention, I provide a basin or trap A, the casing of which is preferably rectangular in its general outline and adapted to fit in the masonry or brickwork around and form a lining for the manhole-shaft. The basin or trap A has within it the manhole proper $a$, whose top edge stands above the upper edge of the trap and a chamber $b$ surrounding said manhole to receive any water that may pass through the ventilating-openings of the cover referred to more fully farther on. The upper or top edge or surface of the trap is inclined, as at $a'$, having, preferably, the same general inclination as the surrounding surface or street, and the bottom of said trap may or may not be correspondingly inclined. The purpose of thus inclining the top edge of the trap or basin is, in addition to conforming it to the surface of the street, to lower the height of one side of the trap, causing it to approximately taper thereat and form the discharging side for the chamber $b$. The chamber $b$ inclines abruptly downward from the top edge of the manhole $a$ and entirely around it and toward the casing of the trap, thus giving it the form of a truncated cone around the manhole. The upper edge of the discharging or lower side of the basin or trap A is below the top edge of the manhole proper $a$, so that the drainage can never overflow into the conduit, while the overflow will take place at the surface on the lower side next to the gutter, thus dispensing with the use of a drain-pipe below the surface and simplifying the construction of the parts.

B is the cover, adapted to fit snugly into and rest upon a shoulder $a^2$ on the inside of the upper edge of the basin or trap in the usual manner, and having a crowning or rounded surface with an imperforate portion immediately above and slightly removed from the edge of the manhole $a$, and having the same general inclination as the surrounding surface, but standing slightly above it to permit the passage of air or gas out of the manhole-shaft.

The cover, as usual, has its upper surface provided with raised portions or otherwise roughened for a purpose well understood, and also means for readily lifting it, and has near one end a series of ventilating-openings $f$, arranged in alignment with the trap-chamber $b$, which while providing for thorough ventilation will not permit, by reason of said arrangement, the entrance of water or other extraneous or foreign substance to the conduit through the manhole.

In the under side of the cover B is a series of longitudinal concave channels $f'$, adapted to register with a series of cavities $g$ in the top edge of the lower side of the basin or trap A and uniting with said cavities to form overflow-outlets thereat for the water from the basin or trap.

In the modification shown in Fig. 5 the basin $A^\times$, in all other respects similar to that of Fig. 1, except as hereinafter pointed out, has a removable bottom $b'$, with simply a ventilating-opening $b^2$ in the upper edge of its truncated-cone portion and itself forming the cover of the manhole proper and supporting the outer cover $c'$, in this instance having a downwardly-projecting flange $c^2$, fitting within the basin or trap and resting upon said bottom.

The removable bottom $b'$, instead of being integral with the casing of the basin or trap, as in Fig. 1, rests upon an inner shoulder $a^\times$ of the said casing some distance below the top edge of the latter and packed water-tight thereat, and is therefore adapted to be bodily removed, together with the superposed cover $c'$, in opening the manhole-shaft for cleaning or access to the conduit.

The basin or trap A may be cast with its vertical lines perpendicular to the plane of the surface, the set of the trap with the slope of the street giving the necessary inclination to the basin for the surface discharge. In this case the bottom rim of the basin will not be vertical when the basin is set, but will be inclined according to the slope of the street.

Having thus fully described my invention, what I claim, and desire to secure by Letters Patent, is—

1. The covered ventilated trap or basin for streets or other exposed points, having the upper edge of the lower wall of its chamber adapted to discharge at the surface, substantially as and for the purpose set forth.

2. The covered ventilated trap or basin for streets or other exposed points, having within its chamber the manhole proper, with the upper or top edge thereof standing above the upper edge of the basin or trap and removed from the imperforate portion of the cover, substantially as and for the purpose set forth.

3. The covered ventilated trap or basin for streets or other exposed points, having the upper edge of the lower wall of its chamber provided with overflow-outlets at the surface, substantially as and for the purpose specified.

4. The covered ventilated trap or basin for streets or other exposed points, having within its chamber the manhole proper, with the upper or top edge thereof standing above the upper edge of the basin or trap, and the upper edge of the lower wall of its chamber adapted to discharge at its surface, substantially as and for the purpose specified.

5. The covered ventilated trap or basin for streets or other exposed points, having within its chamber the manhole proper, with the upper or tip edge thereof standing above the higher edge of the basin or trap and removed from the imperforate portion of the cover, the upper edge of the lower wall of said chamber having discharge-outlets at the surface, substantially as set forth.

6. The covered ventilated trap or basin for streets or other exposed points, having the top or upper edge of the walls of its chamber higher at one side than at the other to adapt said edge to the general inclination of the surrounding surface and having within its chamber the manhole proper, with the top edge thereof standing above the upper edge of the higher wall of said chamber and removed from the imperforate portion of the cover, substantially as set forth.

7. The combination, with the trap or basin, having its top surface in the same general inclination as the surrounding surface, of the ventilated cover having in its under side channels adapted to register with cavities in the upper edge of the lower side of said trap or basin, substantially as specified.

8. The covered ventilated trap or basin for streets or other exposed points, having the top or upper edge of the walls of its chamber higher at one side than at the other and having within its said chamber the manhole proper, with the top edge thereof standing above the upper or top edge of the higher wall of said chamber, the cover of said basin or trap having in its under side channels adapted to register with cavities in the top or upper edge of the lower wall of said chamber, substantially as and for the purpose specified.

In testimony whereof I affix my signature in presence of two witnesses.

WILMOT LAKE.

Witnesses:
CHAS. G. LYNCH,
G. Y. ATLEE.